United States Patent
Erge et al.

(10) Patent No.: US 10,920,584 B2
(45) Date of Patent: Feb. 16, 2021

(54) DETECTION OF INFLUX AND LOSS OF CIRCULATION

(71) Applicant: SCHLUMBERGER TECHNOLOGY CORPORATION, Sugar Land, TX (US)

(72) Inventors: Oney Erge, Houston, TX (US); Ines De Mata Cecilio, Cambridge (GB); Richard Dearden, Cambridge (GB); Jonathan Dunlop, Cambridge (GB); Walter David Aldred, Cambridge (GB); Ashley Bernard Johnson, Cambridge (GB); Iead Rezek, Cambridge (GB); Benjamin Peter Jeffryes, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/765,476

(22) PCT Filed: Sep. 30, 2016

(86) PCT No.: PCT/US2016/054573
§ 371 (c)(1),
(2) Date: Apr. 2, 2018

(87) PCT Pub. No.: WO2017/059153
PCT Pub. Date: Apr. 6, 2017

(65) Prior Publication Data
US 2018/0291728 A1 Oct. 11, 2018

Related U.S. Application Data

(60) Provisional application No. 62/236,220, filed on Oct. 2, 2015.

(51) Int. Cl.
*E21B 21/08* (2006.01)
*E21B 47/10* (2012.01)
(Continued)

(52) U.S. Cl.
CPC ............ *E21B 47/117* (2020.05); *E21B 21/08* (2013.01); *E21B 47/06* (2013.01); *E21B 47/10* (2013.01); *G06N 7/00* (2013.01)

(58) Field of Classification Search
CPC ........ E21B 21/08; E21B 47/10; E21B 47/1025
See application file for complete search history.

(56) References Cited

U.S. PATENT DOCUMENTS 3,338,319 A * 8/1967 Griffin, III .............. E21B 21/08
125/11.01
4,043,193 A 8/1977 Bailey
(Continued)

FOREIGN PATENT DOCUMENTS

WO 2013181143 A1 12/2013

OTHER PUBLICATIONS

Brakel, J. et al., "Smart Kick Detection: First Step on the Well Control Automation Journey", SPE-173052, SPE Drilling & Completion, 2015, 30(3), 10 pages.
(Continued)

*Primary Examiner* — Cathleen R Hutchins

(57) ABSTRACT

A method for detecting an influx and/or loss of circulation in a wellbore, comprising measuring a condition in the wellbore using a downhole sensor; determining that a positive displacement pump is shut off or turned on; predicting pit volume and/or gas concentration at a plurality of time points after the positive displacement pump is shut off or turned on using the measured condition in the wellbore prior to the positive displacement pump is shut off or turned on, wherein the measured condition correlates with the pit volume and/or
(Continued)

gas concentration; measuring pit volume and/or gas concentration at the plurality of time points; comparing the predicted and the measured pit volumes and/or gas concentrations at the plurality of time points; and producing a warning signal if the difference between the predicted and the measured pit volumes and/or gas concentrations is greater than a pre determined value.

20 Claims, 12 Drawing Sheets

(51) Int. Cl.
*E21B 47/117* (2012.01)
*E21B 47/06* (2012.01)
*G06N 7/00* (2006.01)

(56) References Cited

U.S. PATENT DOCUMENTS

| | | | |
|---|---|---|---|
| 5,080,182 A | 1/1992 | Thompson | |
| 5,952,569 A | 9/1999 | Jervis et al. | |
| 6,234,250 B1 | 5/2001 | Green et al. | |
| 2011/0220410 A1* | 9/2011 | Aldred | E21B 44/00 |
| | | | 175/26 |
| 2013/0325351 A1 | 12/2013 | Haberer et al. | |
| 2014/0345940 A1 | 11/2014 | Milner et al. | |
| 2015/0134258 A1* | 5/2015 | Luppens | E21B 49/003 |
| | | | 702/11 |
| 2017/0314382 A1* | 11/2017 | Torrione | E21B 47/10 |

OTHER PUBLICATIONS

Ali, T. H. et al., "Automated Alarms for Smart Flowback Fingerprinting and Early Kick Detection", presented at the SPE/IADC Drilling Conference held in Amsterdam, The Netherlands, 2013, 9 pages.
International Preliminary Report on Patentability of International Patent Application No. PCT/US2016/054573, dated Apr. 12, 2018, 13 pages.

\* cited by examiner

DETECTION OF INFLUX AND LOSS OF CIRCULATION

CROSS-REFERENCE TO RELATED APPLICATIONS

This application claims priority to and the benefit of U.S. Provisional Application No. 62/236,220, filed Oct. 2, 2015, the entire disclosure of which is hereby incorporated herein by reference.

BACKGROUND

To be able to detect any kick or an influx as early as possible is very important for safety, environment, and overall cost of the wellbore construction process. Several methods are traditionally used depending on the rig's drilling state.

For example, while drilling and circulating, the differential flow and the pit volume are usually taken as basis for early kick/loss detection.

While tripping, the trip tanks and the pit volume can be analyzed to look for an anomaly that would indicate a kick or loss.

The most of the reported kicks occur at connections where the main indicator is within the flowback signature. This analysis is commonly referred to as flowback fingerprinting. Flowback Fingerprinting:

At the connections, the pumps are turned off and the pressure exerted to the formations reduces to the hydrostatic pressure (from equivalent circulating density (ECD) to equivalent static density (ESD)). At this time, a certain amount of drilling fluids flows back to the mud pits. This flow is referred as "flowback".

This pressure decreases and the flowback is correlated. Under normal circumstances, flowback should show a repeatable pattern when measured over successive cycles.

This interpretation and comparison analysis of successive patterns is known as "flowback fingerprinting".

Conventionally, this analysis is conducted with a skilled engineer that observes the trend changes and interpret the results manually.

There are a lot of transient behaviors occur during the flowback and a macroscopic analysis visually done by an engineer may not be sufficient enough to be able to detect a kick/loss as early as possible. Some of the transient occurrences are:

Flowback volume is dependent on pump shut in duration and pressure.

There is a delay between the start of the flowback and the pump shut in. Flowback starts as the pressure is relieved from the wellbore. So, while the pump is being shut off, the flowback would already be started. This delay can impair the analysis if not accounted for.

BRIEF DESCRIPTION OF THE DRAWINGS

The disclosure will now be described, by way of example only, with reference to the accompanying drawings in which:

FIG. 7 shows an example of transient effects analysis of the mud pit volume when the pumps are turned on.

DESCRIPTION

Figure 1:
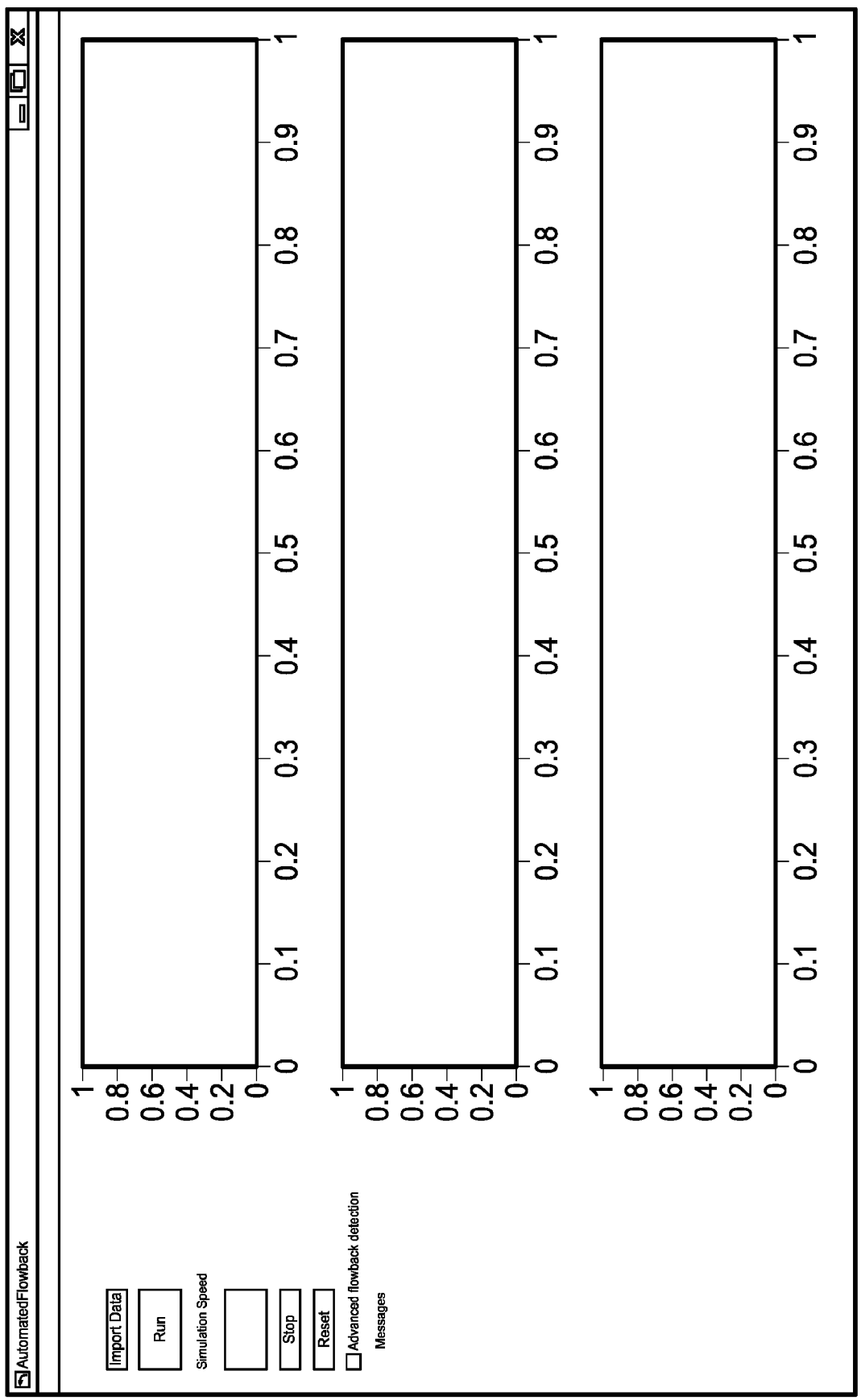
FIG. 1 shows an example graphical user interface.

Embodiments of the present disclosure relate to an automated system for detection of influx and/or loss of circulation.

The ensuing description provides preferred exemplary embodiment(s) only, and is not intended to limit the scope, applicability or configuration of the present disclosure. Rather, the ensuing description of the preferred exemplary embodiment(s) will provide those skilled in the art with an enabling description for implementing a preferred exemplary embodiment of the present disclosure, it being understood that various changes may be made in the function and arrangement of elements without departing from the scope of the present disclosure.

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless sensors and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A connection is defined as any threaded or unthreaded union or joint that connects two tubular components. At a connection, the pressure pump is turned off, and a joint or stand of drillpipe is added to the top of the drillstring.

Tripping is defined as the act of pulling the drillstring out of the hole or replacing it in the hole. A pipe trip is usually done because the bit has dulled or has otherwise ceased to drill efficiently and must be replaced.

A kick is defined as a flow of formation fluids into the wellbore during drilling operations. The kick is physically caused by the pressure in the wellbore being less than that of the formation fluids, thus causing flow. This condition of lower wellbore pressure than the formation is caused in two ways. First, if the mud weight is too low, then the hydrostatic pressure exerted on the formation by the fluid column may be insufficient to hold the formation fluid in the formation. This can happen if the mud density is suddenly lightened or is not to specification to begin with, or if a drilled formation has a higher pressure than anticipated. This type of kick might be called an underbalanced kick. The second way a kick can occur is if dynamic and transient fluid pressure effects, usually due to motion of the drillstring or casing, effectively lower the pressure in the wellbore below that of the formation. This second kick type could be called an induced kick. A kick is therefore an example of an influx.

One aspect of the present disclosure relates to using an automated system to carry out the flowback fingerprinting. Furthermore, it is recognized that flowback fingerprinting is physically linked to other systems such as pit volume totalizer (PVT) that monitors the pit volume during drilling and tripping. A flexible system is disclosed that also can combine the automated flowback fingerprinting with systems such as automated pit volume monitoring and/or gas monitoring.

Another aspect of the present disclosure relates to a flexible, self-learning automated flowback fingerprinting system that can also detect the true start of the flow coming back to the surface and accounts for the transient behavior such as the dependency of flowback on the pump shut off duration and the pressure.

A further aspect of the present disclosure relates to a system that combines the likelihood of a kick/loss by doing automated flowback fingerprinting and automated returns monitoring on the tank levels and connection gas, etc. at connections to assess the kick/loss likelihood. These secondary analysis such as pit volume and connection gas monitoring, etc. at each connection are correlated to the flowback signatures. These analysis such as pit volume/connection gas allows to detect a kick/loss and also combines the likelihood of the event with the flowback fingerprinting to allow even earlier detection of an influx or a loss at the connections.

The proposed system focuses on the "connections" rig's drilling state and does the early kick/loss detection by combining the information gathered by executing automated flowback fingerprinting and automated return analysis.

The system is flexible and uses the common conventional drilling rig sensors. The system requires a pair of sensors at the least. The first sensor can be the stroke counter (total strokes per minute or the flow rate derived from the total strokes per minute) or standpipe pressure, etc. A combination of the sensors can be used as the first sensor. Such as a combination of total strokes per minute, flow rate and standpipe pressure can be used together.

The secondary sensor can be a fluid level sensor and/or a gas level sensor such as a gas chromatograph. Fluid level sensors at the mud tanks can measure total volume in the pit/tank. Gas level sensors can measure gas concentration of typically methane (C1) through pentane (C5) in e.g. PPM (part per million). Alternatively, flow rate out (flow paddle % or if any accurate flow meters available, such as Coriolis, etc.) can be measured and used. A combination of the sensors can be used as the second sensor. Flow rate out can be combined with the total active volume to give better information on the volume coming back to the surface, their combination can be used as the secondary sensor. Flow meter reading is converted to the volume. A flow meter such as Coriolis will provide a more accurate measurement than a paddle, hence the system's sensitivity is also adjustable to be able to be tuned, depending on the level of sensor's accuracy.

Stroke counter at the pump can be used to measure and monitor stroke count signal, stroke count rate, and/or flow rate in. Alternatively, a flow meter located at the inlet of the wellbore can be used to measure and monitor flow rate in. A pressure transducer at the standpipe can be used to measure and monitor standpipe pressure. These measurements (stroke count signal, stroke count rate, flow rate in and standpipe pressure) provide useful information.

Firstly, these measurements all directly or indirectly indicate the pressure in the system, thus by measuring these parameters, it can be determined whether the positive displacement pump is shut off or turned on.

Secondly, these measurements before the pump is shut off or turned on correlate to the pit volume and/or gas concentration after the pump is shut off or turned on. For example, the higher the standpipe pressure before the pump is shut off, the steeper the curve for pit volume change after the pump is shut off. Therefore these measurements before the pump is shut off or turned on can be used to predict pit volume and/or gas concentration after the pump is shut off or turned on. The prediction should be accurate if there isn't any influx or loss of circulation in the wellbore. Thus, any difference between measured pit volume/gas concentration and predicted pit volume/gas concentration indicates influx or loss of circulation.

The return analysis (pit volume, flow rate out, connection gas) is done by comparing the total active volume (or connection gas) recorded right before the flowback starts coming back to the surface. This way, the pit volume is not affected by the flowback, it means transient effects are avoided. These recorded pit volumes at the start of each connection are compared from one connection to another. A history is kept and a system such as a segmentation algorithm and logic checks are applied to understand the likelihood of the influx/kick.

Trends are analyzed to understand an anomaly, such as during drilling, an increase in pit volume from one connection to another is not expected. After understanding and then accounting for the noise with the filtering algorithm, we can detect an influx. Similarly, by understanding the rate of decrease in pit volumes during drilling (because, the depth and hence the volume of the hole will increase and pit volume will decrease), an algorithm such as a segmentation algorithm can detect, if any abrupt decrease is occurred and we can detect any loss circulation.

The algorithm can be a segmentation algorithm or any other simpler or complex statistical algorithm. Several methods or combinations can be used to detect the abnormal flowback, which is explained at the detailed descriptions section.

Either a basic or an advanced state detection can be used. A state detection is proposed that allows finding the true start of the flowback by handling the delay between the pump shut off and the volume increase with the flowback. Basic detection estimates the time when the pump rate reaches a threshold (a low enough value, such as 5 gpm or 20 psi pressure, etc), then marks that time as the start of the flowback coming back to the surface. This basic detection is available as a feature at the proposed system. The advanced flowback detection can handle this delay and find the start of true flowback. It is mentioned in detail at the next section.

After the state is detected, the initial cycle starts. The history of first sensor is gathered (it can be SPPA, TSPM, etc.) and broken down to "stable" and "pump ramp down" regions. Then the average of the stable region and the average of the slope of pump ramp down is calculated. Average of the stable region infers to the pressure value and the slope indicates the duration of the pump shut off.

Flowback curve: Y-axis can be the normalized total active volume. Total active volume is normalized to start from the zero as soon as the connection is detected. Also Y-axis can be the equations that are given at the detailed descriptions section. X-axis is the time. When a flowback curve is mentioned in this text, it is the Y- and X axes mentioned in this paragraph.

Then, flowback curve starts to be analyzed. This analysis can be continuous as the datapoints are gathered or it can analyze single or several points along the flowback curve. There are several methods or a combination of them can be used for this analysis, they are mentioned at the detailed description section. Summary is given with the bulletpoints below:

- Flowback curve can be fitted into a function, such as "Power Law" function, and the parameters of the fitted curve can be analyzed to detect any anomaly.
- Flowback data can be directly used without any fit and the y parameter data at one or several time points can be analyzed to detect any anomaly.
- Flowback curve can be fitted into a function, such as "Power Law" function, and y parameter data at one or several time points can be analysed together to detect any anomaly.
- Instead of fitting the flowback curve to an equation, a Gaussian processes might be utilized to model the flowback function (Fb).
- It can be regression analysis or any machine learning system, clustering or neural networks can be used.
- The average of the some of the flowback curves can be stored, an uncertainty boundary can be applied and any deviations from the "safe" zone can be monitored using a statistical approach, which can be the standard deviation or any other outlier test or simply locating the datapoint outside the boundary.

At the next cycle, when the new state is detected, flowback is expected to follow a similar trend, considering how the driller shut off the pumps. If the average of the stable region and the average of the slope of first sensor is similar to the previous one, it means driller is following a consistent trend. This behavior can be incorporated into the analysis either with the physical equations given at the detailed description section or using one of the methods described above, such as using Gaussian processes.

In order words, if the driller followed a similar pump rate and pump ramp down, then the flowback signatures should be similar too. First, this behavior is understood and then as the flowback comes to the surface, the flowback curve is fitted to the Power Law function. The "a" and "b" are extracted and they are compared to the ones from the previous cycle. An outlier detection method and/or a clustering methods are used to classify the data and understand the outlier.

The information from other sources can be combined to better assess the likelihood of the kick, such as gas levels, pit volumes, etc. Such as the sensitivity of the flowback fingerprinting is adjusted with the information gathered from the pit volume monitoring from one connection to another. For example, if the probability of the loss circulation increases at the analysis of pit volume monitoring, therefore the sensitivity of the flowback increases to detect the loss circulation even sooner. The outlier is detected as a kick or loss circulation and an alarm is populated.

Examples

An example graphical user interface (GUI) is presented at FIG. 1. This GUI is not a representation of the final version, but presented to better explain how the system operates.

The system requires a pair of sensors. First sensor can be the stroke counter (total strokes per minute or the flow rate derived from the total strokes per minute) or standpipe pressure, etc. Or, these sensors can be used together, combined as the first sensor. And the second sensor can be the total tank volume (calculated from the level sensors at the mud tanks) or flow rate out (flow paddle % or if any accurate flow meters available such as Coriolis, etc.). Or, these sensors can be used together as combined as the second sensor.

Figure 2:
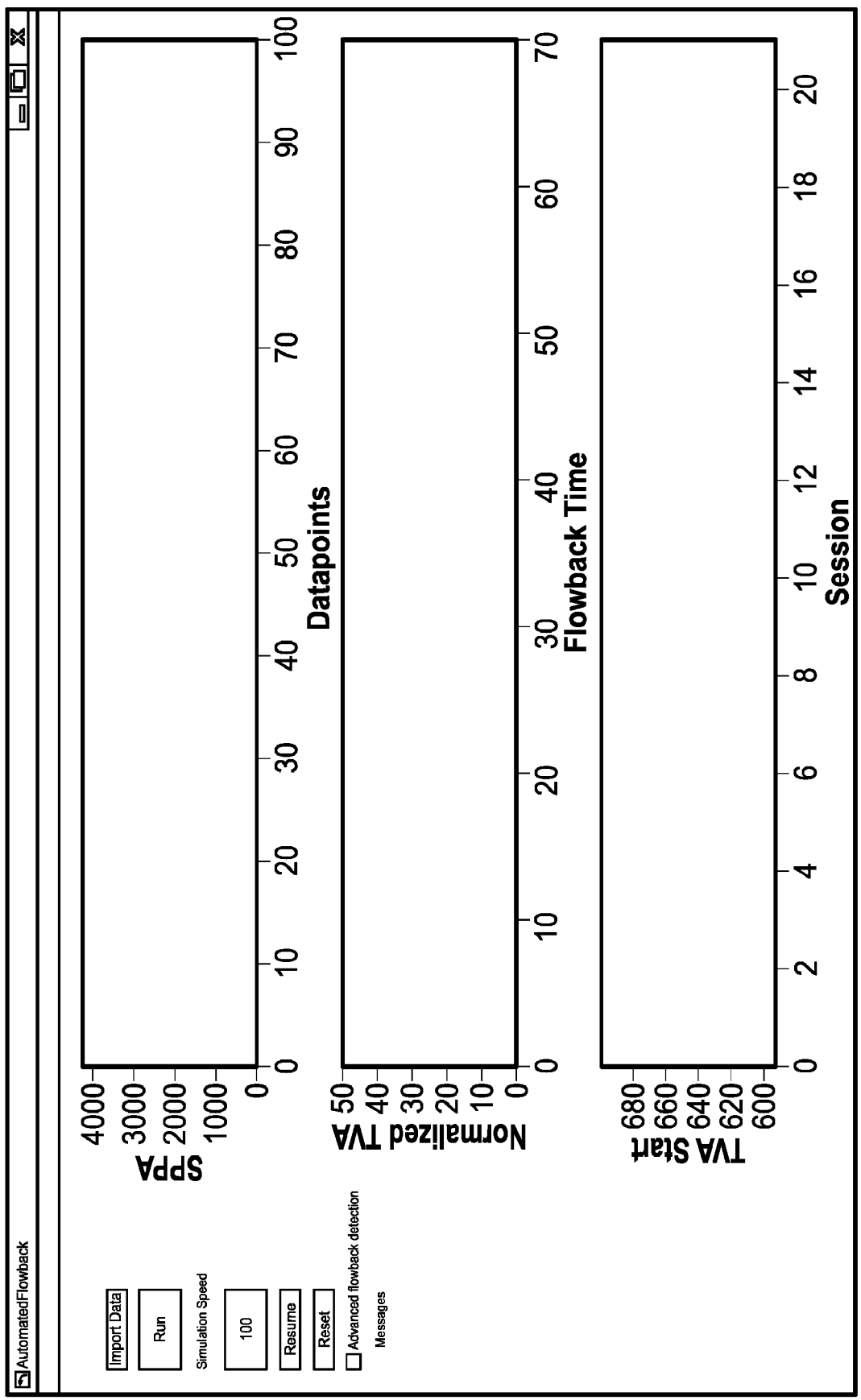
FIG. 2 shows a graphical user interface with selected pair of sensors, which are SPPA and TAV in this example.

In FIG. 2, an example pair of sensors are presented. SPPA (standpipe pressure) and TAV (total active volume) are shown. First plot shows the history of the SPPA sensor after the state is detected. The history can be adjusted to any set number (such as 2 minutes, 5 minutes of history, etc.). As the state detection occurs and the start of the flowback is understood, the history of the SPPA is plotted at the first plot from the top. From the top, at the third plot, "TAV Start" point is plotted. Then, at the second plot, the flowback starts and "Normalized_TAV" or any other equation incorporates the "Normalized_TAV" (they are discussed below in more detail) is plotted in real-time. The volume (y-axis) may be normalized to start from zero at each cycle. Y-axis may be normalized such that a comparison can be made over the successive cycles (it is referred as "session" in this example).

At the second plot of the FIG. 2, flowback curve is presented. The flowback curve can be a normalized TAV or an equation which incorporates the normalized TAV, which will be at the Y-axis. A simple model that includes the physics of the flowback can be used to include the effect of pump shut off into the flowback curve.

Simple Models for What Happens when the Pumps go Off

The fluid may be modelled as compressible with a pressure drop at the bottom of the drillstring that is proportional to flow rate squared. The only pressure in the annulus comes from gravity, which can be ignored in this analysis.

In the drillpipe the difference in flow rate between the top and bottom of the string is given by $$Q(L) - Q(0) = -\Lambda \frac{dP}{dt}$$

Where Λ is the compliance of the fluid in the string and the pressure comes from $$P = \frac{1}{2}kQ(L)^2$$

Thus $$Q(L) - Q(0) = -\Lambda k Q(L)\frac{dQ(L)}{dt}$$

If the initial flow rate is $Q_0$, and the pumps are shut of suddenly (so $Q(0)=0$)

$$Q(L) = -\Lambda k Q(L)\frac{dQ(L)}{dt}$$

$$\frac{dQ(L,t)}{dt} = \frac{-1}{\Lambda k}$$

Thus, for $0<t<\Lambda k Q_0$ $$Q(L,t) = Q_0 - \frac{t}{\Lambda k}$$

The flow rate through the bit declines linearly to zero. From the pressure drop relation, the stand-pipe pressure declines in a parabola to zero. The total flow-back volume is the integral of this, and thus follows a parabola $$V = \int_{t=0}^{t} Qdt = Q_0 t - \frac{t^2}{2\Lambda k} \text{ for } 0 < t < \Box kQ0$$

$$V = \frac{1}{2}\Lambda k Q_0^2 = \Lambda P_B \text{ for } t > \Box kQ0$$

This is a simplified model. Alternatively, a more advanced model can be used. So at the Y-axis, the k parameter can be plotted and analysis can be done on that:

$$k = \frac{t^2}{2\Lambda(Q_0 t - V)} \text{ for } 0 < t < \Box kQ0$$

$$k = \frac{2V}{\Lambda Q_0^2} \text{ for } 0 < t < \Box kQ0$$

Note that the time for the flow out scales with flow rate and compliance, which is proportional to the length of drillstring.

For this particular model, the main difference between the model and reality is because it does not consider acoustic propagation times, which can be considered and applied with a more sophisticated modeling. The biggest consequence of this is that the smooth parabolic decline in stand-pipe pressure has superimposed on it some oscillations—normally referred to as water hammer. For long wellbores, these will be relatively small, but can be significant for shorter wells. The flow reduction in the annulus also induces oscillations, but because the change in flow rate out of the bit is a lot smoother than the change in flow rate at the pumps, the oscillations are smaller.

The model does not take into account pressure drops along the pipe, but if they are included the solution is not too much different—if flow rate is calculated through the bit there is a bit of a flatter section first, but the flow reduction rate goes asymptotically to a constant.

For normal drilling that's not MPD, the effects of annular pressure drops are relatively small. Although the annular volume is much larger than the drillpipe volume, the annular pressure drops are a lot smaller, and importantly tend to be concentrated near the bottom of the hole where there is relatively little volume for them to affect rather than the top of the hole where they will be affecting the entire hole volume.

With a choke at the top of the annulus, a suitable model is one with two volumes and two quadratic pressure drops, where the first feeds into the second. It is discovered that this looks like a linear flow out with a bit of hesitation first. With MPD, the smaller choke pressure compared to the bit pressure drop affects a very large volume, so in general the dominant storage effect is in the annulus rather than the drillpipe, though obviously the exact balance depends on geometry and back-pressure.

If the driller brings down the pumps slowly, but at a rate that is still fast compared to the characteristic times of the system, then it doesn't make much difference to the answer. For normal drilling, the time for the flow out will be 10-60 seconds, so if the time is 20 seconds and the pumps go down over 5 seconds, the flow out will not be much different. If the pumps go down over 40 seconds, then it will. Note that because of the greatly increased storage with MPD and a choke, the characteristic time will be much longer too so the pumps may have to come down really slowly to make much difference.

The Y-axis can be a normalized TAV or an equation incorporating the normalized TAV such as the example as described above. The x-axes represents time, for this particular dataset, the frequency was 3 seconds, therefore, from one datapoint to another 3 second passes. Any representation of time can be used.

Figure 3:
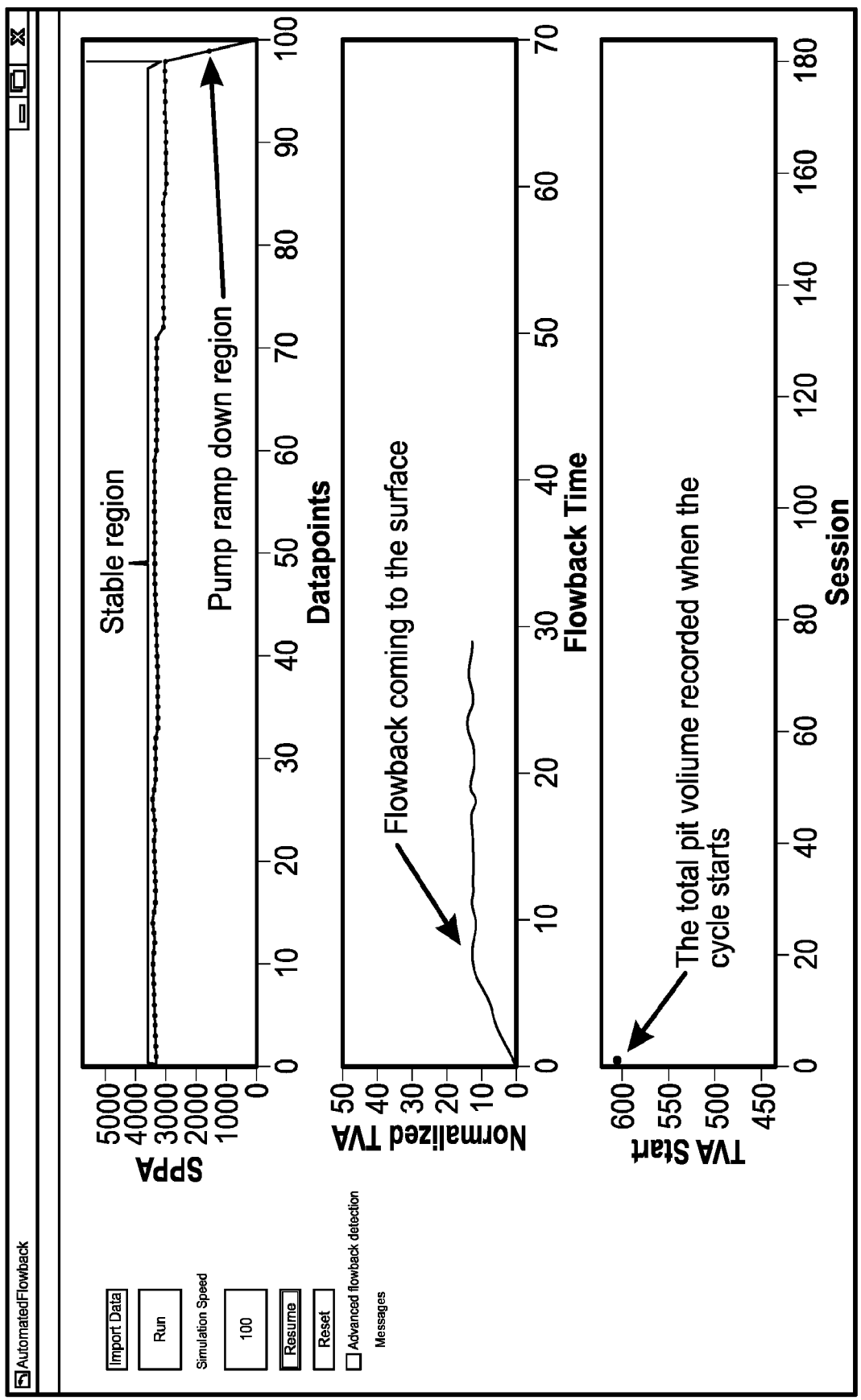
FIG. 3 shows a graphical user interface where a first cycle (or "session") has been completed.

In FIG. 3, a completed cycle is presented. The stable region of the first plot may be determined using an algorithm such as a segmentation algorithm. Therefore, the values are broken down to "stable region" and "ramp down". The average of the values at the stable region may be calculated using such an equation:

$$\bar{x}^k = \frac{1}{n}\sum_{i=1}^{n} x_i \quad (1)$$

At which, x is the datapoint; n is the number of selected stable points and k is the denotation for the particular cycle. Then the slope of the ramp down region can be calculated as:

$$m^k = \frac{y_2 - y_1}{x_2 - x_1} \quad (2)$$

As an alternative, an algorithm that segments the data stream does a regression of the constant $\bar{x}^k$ and $m^k$ can be used.

Figure 4:
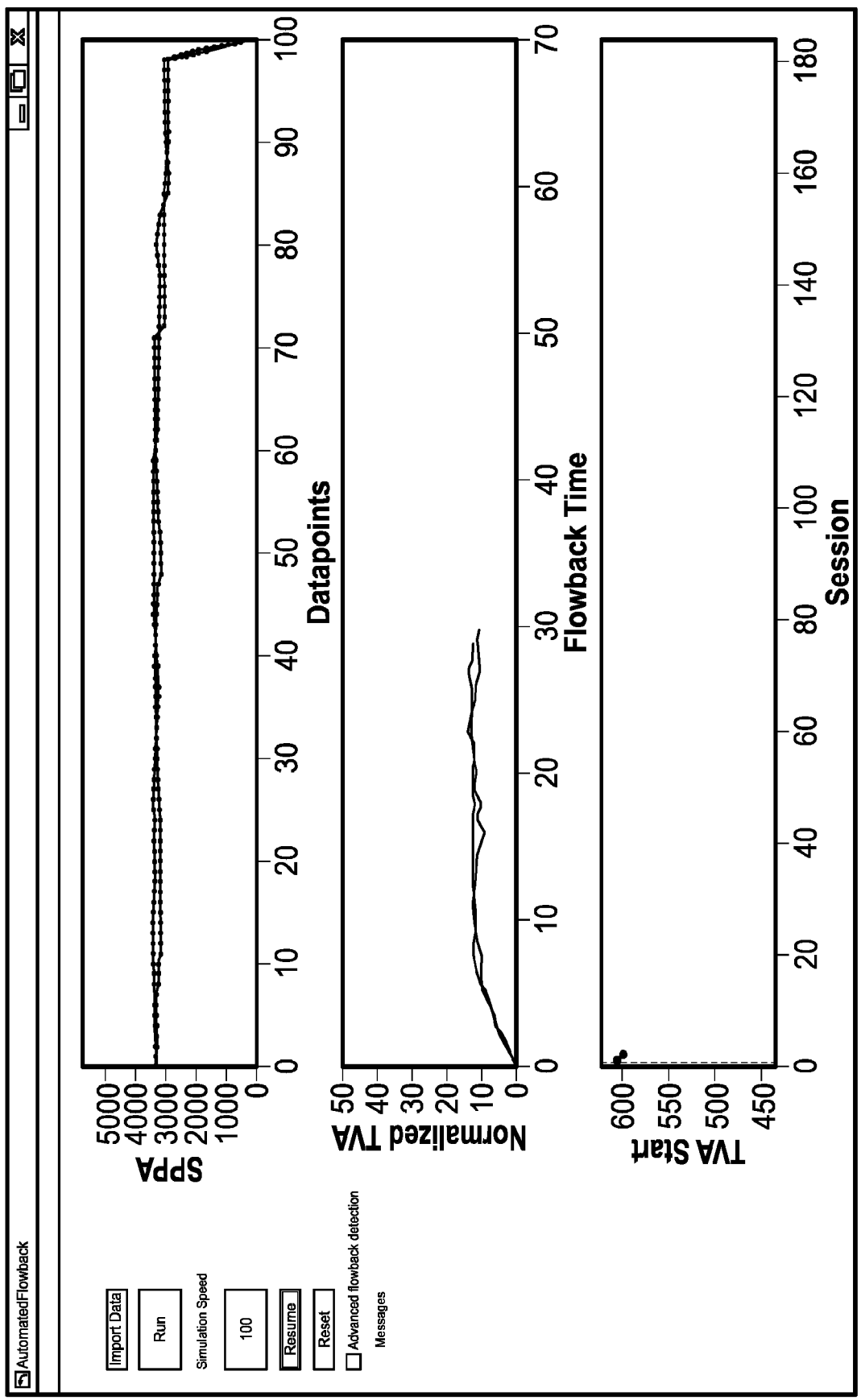
FIG. 4: shows a graphical user interface where a second cycle has been completed, which is an example of normal successive cycles without any influx or loss.

In FIG. 4, it is shown that a successive cycle follows it predecessor. Each cycle is color coded and the color for the particular cycle is the same among all the three plots. Now the program already analyzed and recorded the SPPA average, pump ramp down duration, and the previous cycle's fitted parameters; the current and previous cycle will be compared at each timestep to detect any anomaly. This relationship between the first sensor (SPPA in this case) and the second sensor (TAV in this case) is analyzed using an algorithm, that can be a Bayesian based algorithm or any other, such as a clustering algorithm. A rough example is as follows: a flowback of a SPPA average of 2000 psi of the first cycle can be comparable to the flowback during an SPPA avg. of 1950 psi, but not to a 1000 psi. This scaling and classification is handled to compare only relevant correlations.

At the third plot, the pit volume analysis is done by comparing the total volume recorded right before the flowback is coming back to the surface. This way, the pit volume is not affected by the wellbore breathing or ballooning. These recorded pit volumes at the start of each connection may be compared by connection to connection. A history may be kept and a system such as a segmentation algorithm may be applied to understand the likelihood of an influx/loss.

Several methods or combination of them can be used to analyze the flowback curve:

1. Flowback curve can be fitted into a function, such as "Power Law" function, and the parameters of the fitted curve can be analyzed to detect any anomaly.

2. Flowback data can be directly used without any fit and the y parameter data at one or several time points can be analyzed to detect any anomaly.

3. Flowback curve can be fitted into a function, such as "Power Law" function, and the y parameter data at one or several time points can be analysed together to detect any anomaly.

4. Instead of fitting the flowback curve to an equation, a Gaussian processes might be utilized to model the flowback function (Fb).

5. It can be regression analysis or any machine learning system, clustering or neural networks can be used.

6. The average of the some of the flowback curves can be stored, an uncertainty boundary can be applied and any deviations from the "safe" zone can be monitored using a statistical approach, which can be the standard deviation or any other outlier test or simply locating the datapoint outside the boundary.

1. Flowback curve can be fitted into a function, such as "Power Law" function, and the parameters of the fitted curve can be analyzed to detect any anomaly.

As the flowback comes to the surface as in the second plot in FIG. 3, the flowback curve can be fitted to such an equation:

$$Fb_i^k = a^k \, t_i^{b^k} \qquad (3)$$

As indicated at Eq. 3, "a" and "b" of each cycle are recorded. While within a cycle, "a" and "b" of the current timestep is overwritten by the next timestep. But, over the each cycle, "a" and "b"s are stored.

As an example, such an equation as well, can be used for the analysis:

$$Fb_i^k = a^k(1\exp(b^k t_i^k)) \qquad (4)$$

At which, "a" gives the information about when the flowback will be plateaued.

A segmentation or classification algorithm or any outlier detection method can be used to detect the abnormal flowback.

2. Flowback data can be directly used without any fitting and the data points at one or several time points can be analyzed to detect any anomaly.

Instead of analyzing the parameters of the fit, directly the flowback (Fb) data can be analyzed.

Figure 5:
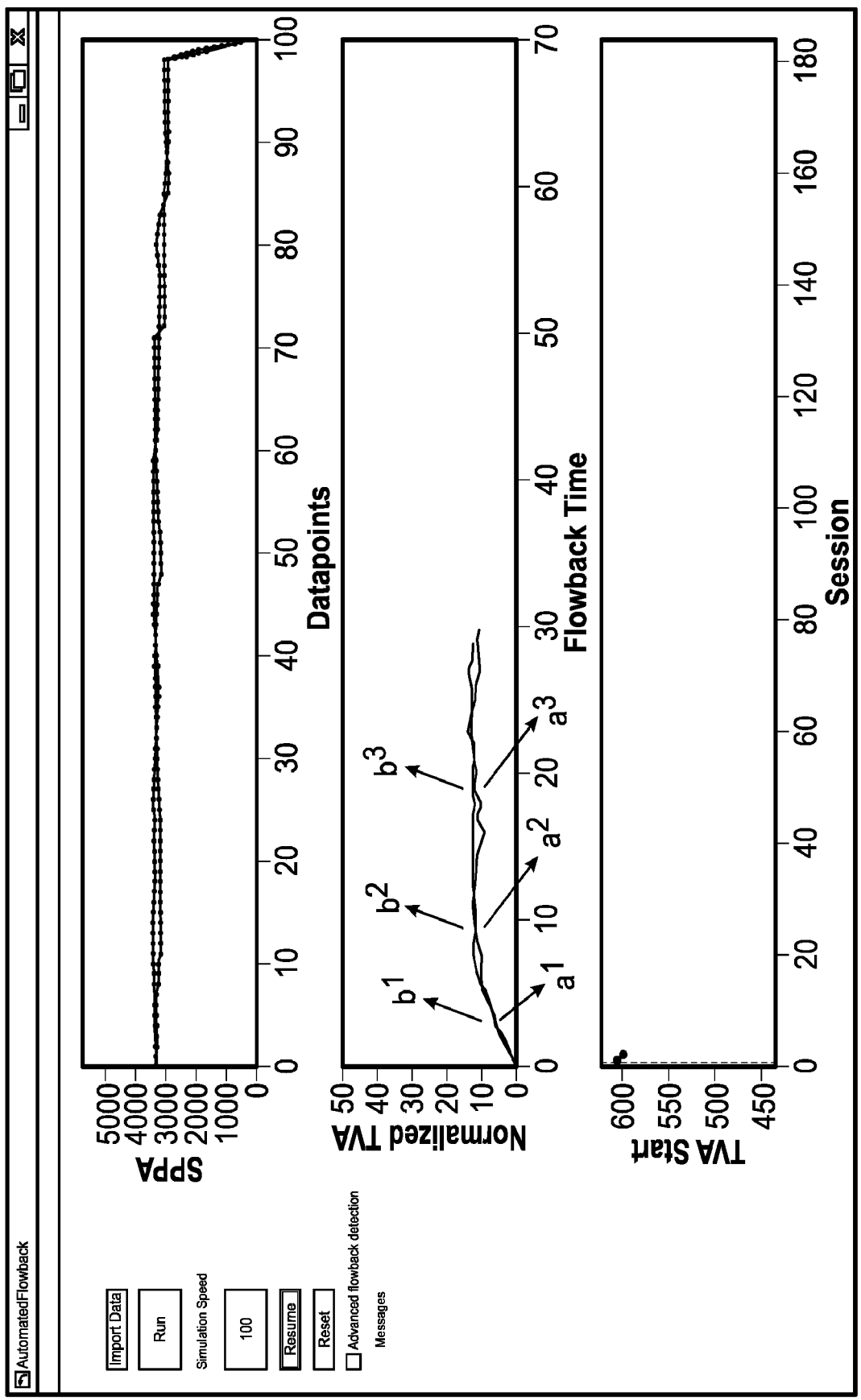
FIG. 5 shows an example of observation points for flowback curve analysis.

Several "observation point(s)" can be selected on the flowback curve. The Fb can be recorded continuously for example every 30 seconds, one minute and/or three minutes and so on. And these points can be compared within each other. An example of observation points on the flowback curve are given in FIG. 5. In FIG. 5, measurements are shown as the flowback curve. The observations points are directly on the flowback curve without any fitting.

A segmentation or classification algorithm or any outlier detection method can be used to detect the abnormal flowback.

3. Flowback curve can be fitted into a function, such as "Power Law" function, and the y parameter data of the fitted curve at one or several points along the curve can be analyzed together to detect any anomaly.

The flowback can be fitted into an equation, then several "observation point(s)" can be selected. As an example, the curve can be fitted to a Power Law equation described above. Then, the Fb can be calculated continuously at the time of 30 seconds, one minute and/or three minutes and so on. And these points can be analyzed within each other. Please note that, in this analysis, the observation points are on the fitted curve.

A segmentation or classification algorithm or any outlier detection method can be used to detect the abnormal flowback.

4. instead of fitting the flowback curve to an equation, a Gaussian processes might be utilized to model the flowback function (Fb).

Instead of fitting the flowback curve to the equation 3, a Gaussian process might be utilized to model the Fb function. A recursive Gaussian can be implemented on the flowback that reduces the computational cost heavily.

Not limited to the first sensor, but also several additional parameters, for example measured depth, can be fed into the Gaussian processes together with the first and second sensor that is described within this text. This way, Gaussian Processes can also consider how the pump is shut off, the length of the wellbore, etc.

5. It can be regression analysis or any machine learning system (any of machine learning other than the Gaussian Processes too), clustering or neural networks can be used.

Also, this relationship can be taught to a neural networks (NN) system to build a mathematical model of the flowback.

6. The average of the some of the flowback curves can be stored, an uncertainty boundary can be applied and any deviations from the "safe" zone can be monitored using a statistical approach, which can be a segmentation or classification algorithm or any other outlier test or simply locating the datapoint outside the boundary.

A curve can be fitted as in method 1. An uncertainly boundary can be calculated along the curve based on the average value of the predicted flowback data. Measured data points can be compared with the uncertainty boundary.

A segmentation or classification algorithm or any outlier detection method can be used to detect the abnormal flowback.

If any data is outside the uncertainty boundary, a warning signal for an influx or loss of circulation can be produced. A driller can then perform remedial actions in a timely manner. Such as, the driller can initiate the well control procedure to circulate the kick out, or if it is a loss control he can start pumping the loss circulation materials to stop the loss to the formation.

Trends are analyzed to understand an anomaly, such as during drilling there shouldn't be an increase in pit volume from one connection to another, after understanding and then accounting for the noise with the filtering algorithm, we can detect a kick. Similarly, by understanding the rate of decrease in pit volumes during drilling (because, the depth and hence the volume of the hole will increase and the pit volume will decrease), an algorithm such as a segmentation algorithm can detect if any abrupt decrease occurs and hence we can detect any loss circulation.

The algorithm can be a segmentation algorithm or any other simpler or complex statistical algorithm can be used.

The system builds the confidence as more data is gathered and analyzed. The flowback model is an adaptive, self-learning model and gets more precise and confident with more data. Also, the system can be calibrated. Such as, inside the casing before drilling the cement, no loss or influx is expected. The system can be calibrated to "weight up" one or several cycles that increases the confidence to detect the anomaly faster.

Any detected anomaly from the connection by connection returns monitoring adjusts the sensitivity of the flowback fingerprinting. For example, if a likelihood of loss circulation is observed by analyzing the trends of the connection by connection returns monitoring (such as a sharp decrease is observed at pit volume), therefore the flowback fingerprinting engine will look for a possible influx by increasing the sensitivity for that particular cycle, to detect the loss even earlier.

Figure 6:
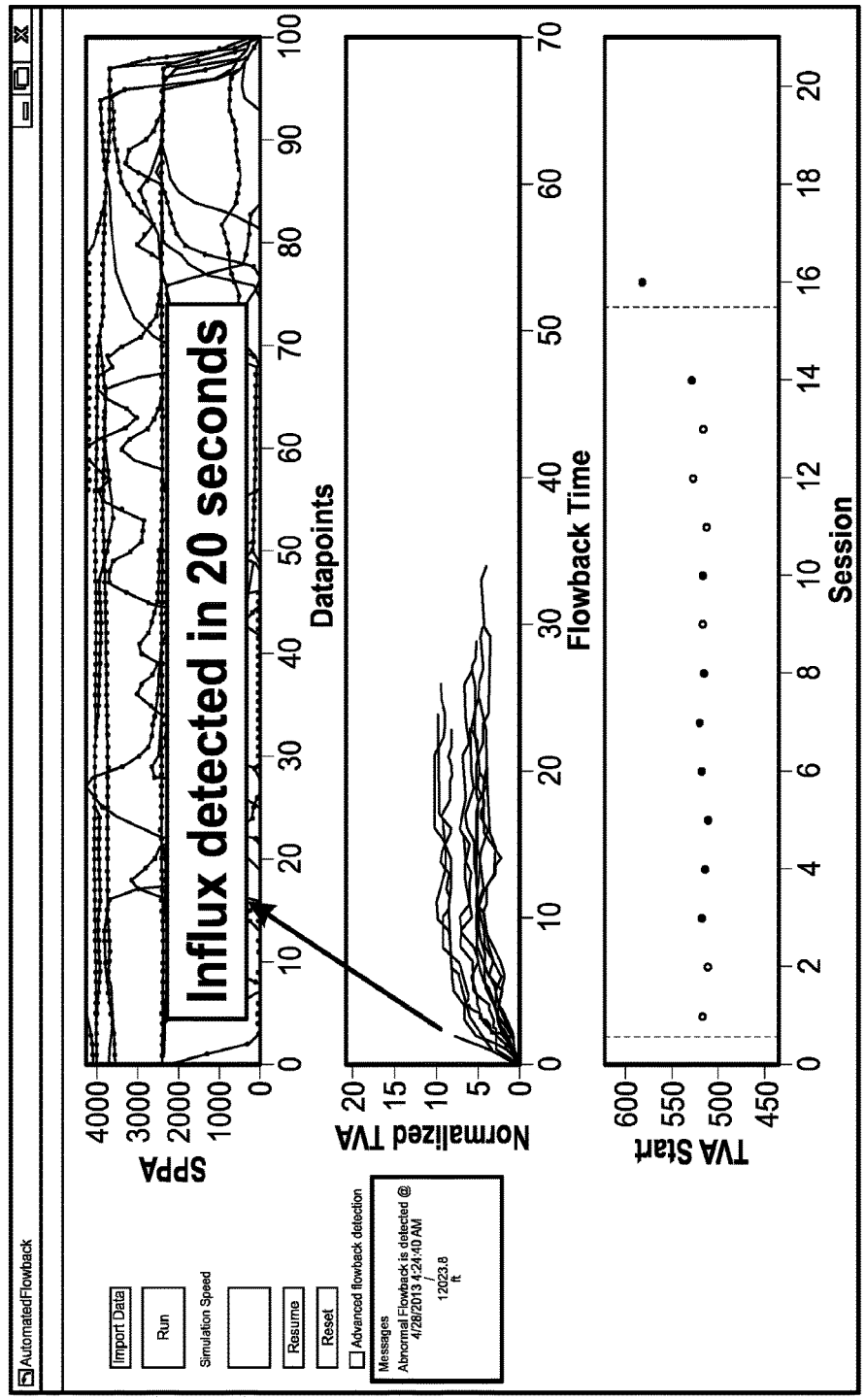
FIG. 6 shows an example of influx detection.

Below, an example of a detected outlier is presented. As it can be observed from the FIG. 6, a macroscopic visual analysis is unlikely to be able to detect the influx early enough.

Also, the connection gas can be analyzed (can be added as the forth plot) in a similar fashion with the connection by connection pit volume monitoring. An increasing trend of connection gas over the connections can indicate a flowing well. Similarly, this sensor can be inputted to the system and be automatically analyzed. As the trend of the connection gas over the connections increases, the sensitivity of the flowback fingerprinting algorithm increases automatically to detect any possible influx earlier than the regular model.

Figure 7:
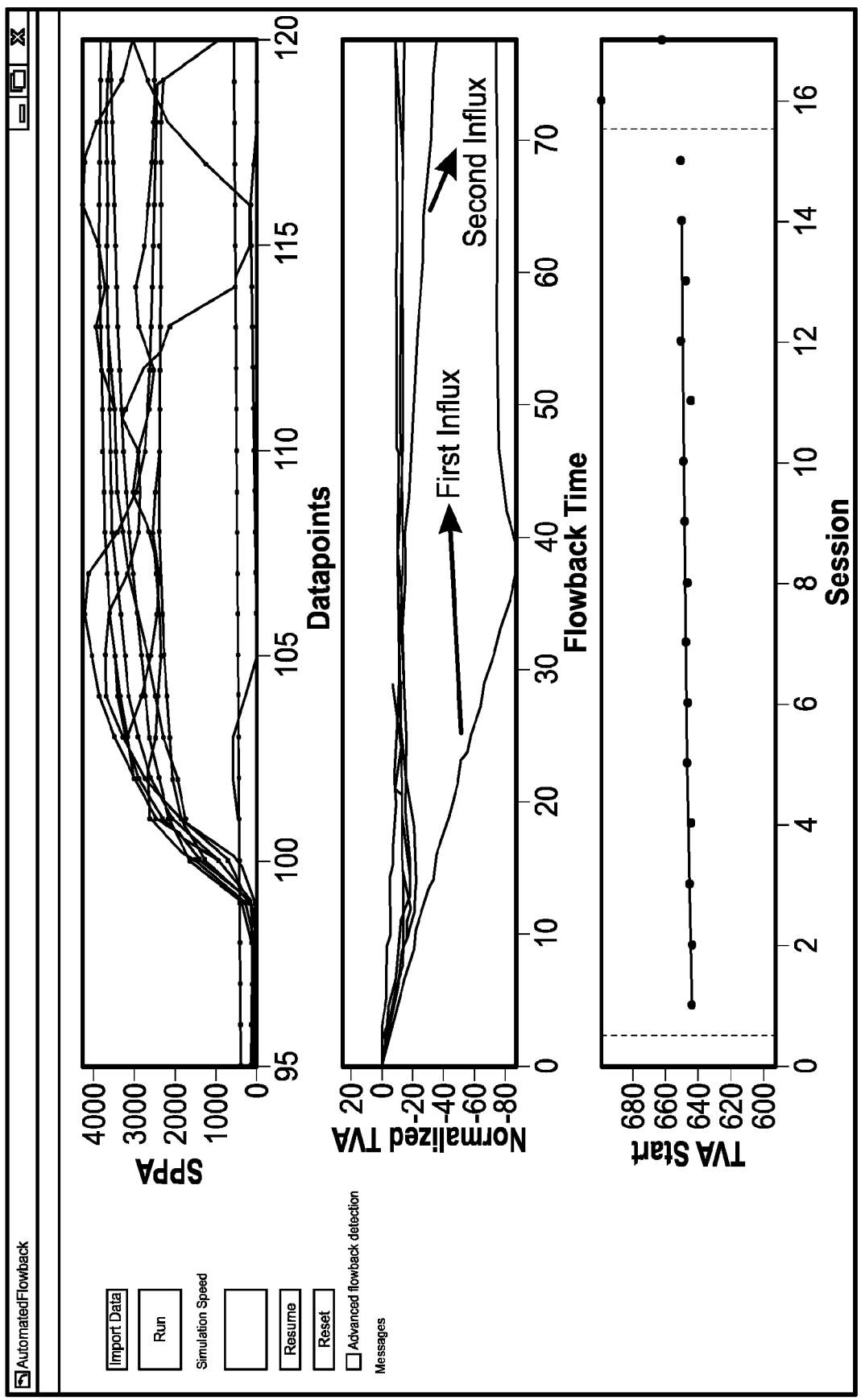

This analysis of transient behavior of the mud tank levels during the connection is done via flowback fingerprinting. The analysis is not limited to the start of the connection, but it can also be applied for the transient effects of the mud pit volume when the pumps are turned on as well. An example of the transient effects are presented at FIG. 7. It can be seen that the signatures of the influxes are quite different from the normal behavior of the mud movement when the pumps are turned on. Applying a similar method described above, the different signatures of the influxes can be detected with the proposed system.

Figure 8:
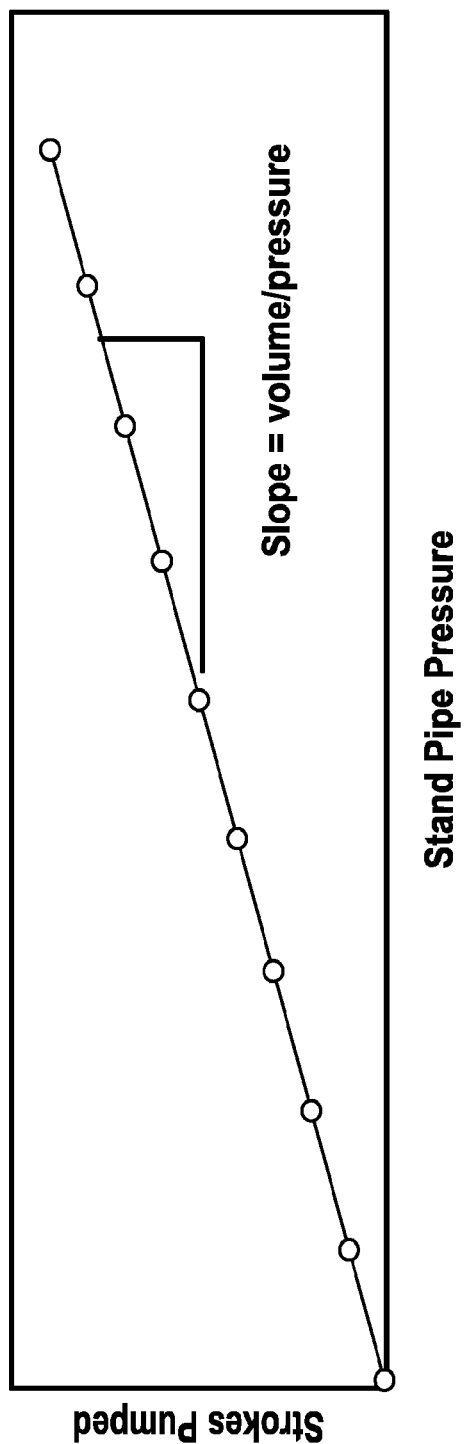
FIG. 8 illustrates information gathered on the compressibility of the wellbore and the fluid during a test that pressurizes the formation in the closed-loop system.

The transient behavior can also be analyzed utilizing the information gathered during a test that pressurizes the formation in the closed-loop system, such as: formation integrity test or a leak off test. The slope calculated during the formation is being pressurized will give the information on the compressibility of the wellbore and the fluid. An example is given at FIG. 8. This information can be used to determine the how much of the fluid will come back to the surface at connections or vice versa how much of it will be reduced at the dynamic condition.

Multiplying the slope with the equivalent circulating density measured or calculated can give the volume that is expected to be moving during these transient events such as pump shut off and pump start. At the availability, this information can be used to determine the likelihood of the influx/loss as similarly described in this chapter.

This type of analysis is not limited to the flowback. An example of fingerprinting the pressure over the successive cycles can be given as: fingerprint the pressure as the pumps turned off and turned on. Over the successive cycle pressure decline or incline follow a similar, repeated pattern. As the pumps are turned off, if the pressure decline is too sharp compared to the previous cycles it means it is u-tubing. As the pumps are turned on, if the pressure incline is taking much more time to develop, it will indicate u-tubing. It means that, this fingerprinting mechanism is not limited to the mud level or flow out sensor, but can also be applied to the pressure or any other sensors to be able to detect states over the successive cycles.

Distinguish Wellbore Breathing Form Influx:

The proposed system may carry out an analysis to distinguish wellbore breathing from an influx.

Figure 9:
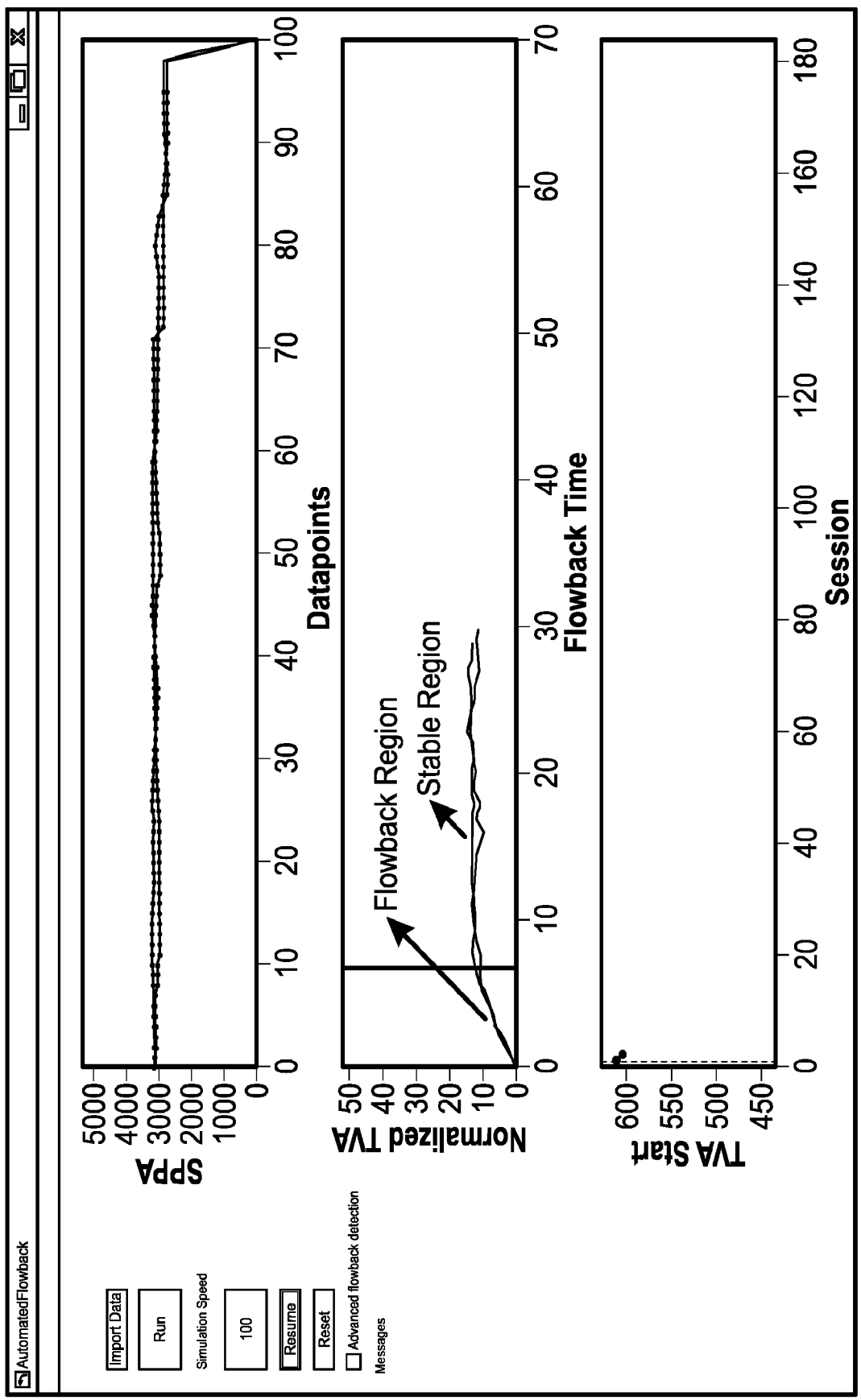
FIG. 9 shows slowback and stable regions of the flowback coming to the surface.

After an anomaly is detected, the possibility of an influx and the possibility of a breathing is compared against each other by evaluating several logic checks and several algorithms. There are some cases at which the possibility of an influx and breathing is evaluated:

By analyzing flowback signature, the relevant flowbacks and the current flowback signatures are broken down to flowback region and stable region. An example is presented at FIG. 9. Here, a simple or a segmentation algorithm can be used to break down the flowback and stable region.

The relevant flowbacks are the flowbacks which had a similar flow, "first sensor" (SPPA, TSPM) signature. They should have similar first sensor (SPPA, TSPM) stable region and pump ramp down region compared to the current flowback.

This time during the abnormal flowback is compared to its relevants' time. If the current stabilization time is not with the range of relevants' stabilization time, then it is labeled as an influx. Otherwise, if it is within the range, then this increases the abnormal flowbacks probability of being a breathing.

The time can be defined as:

$$\text{time}^k = t_{stable}^k t_{start}^k \qquad (3)$$

Figure 10:
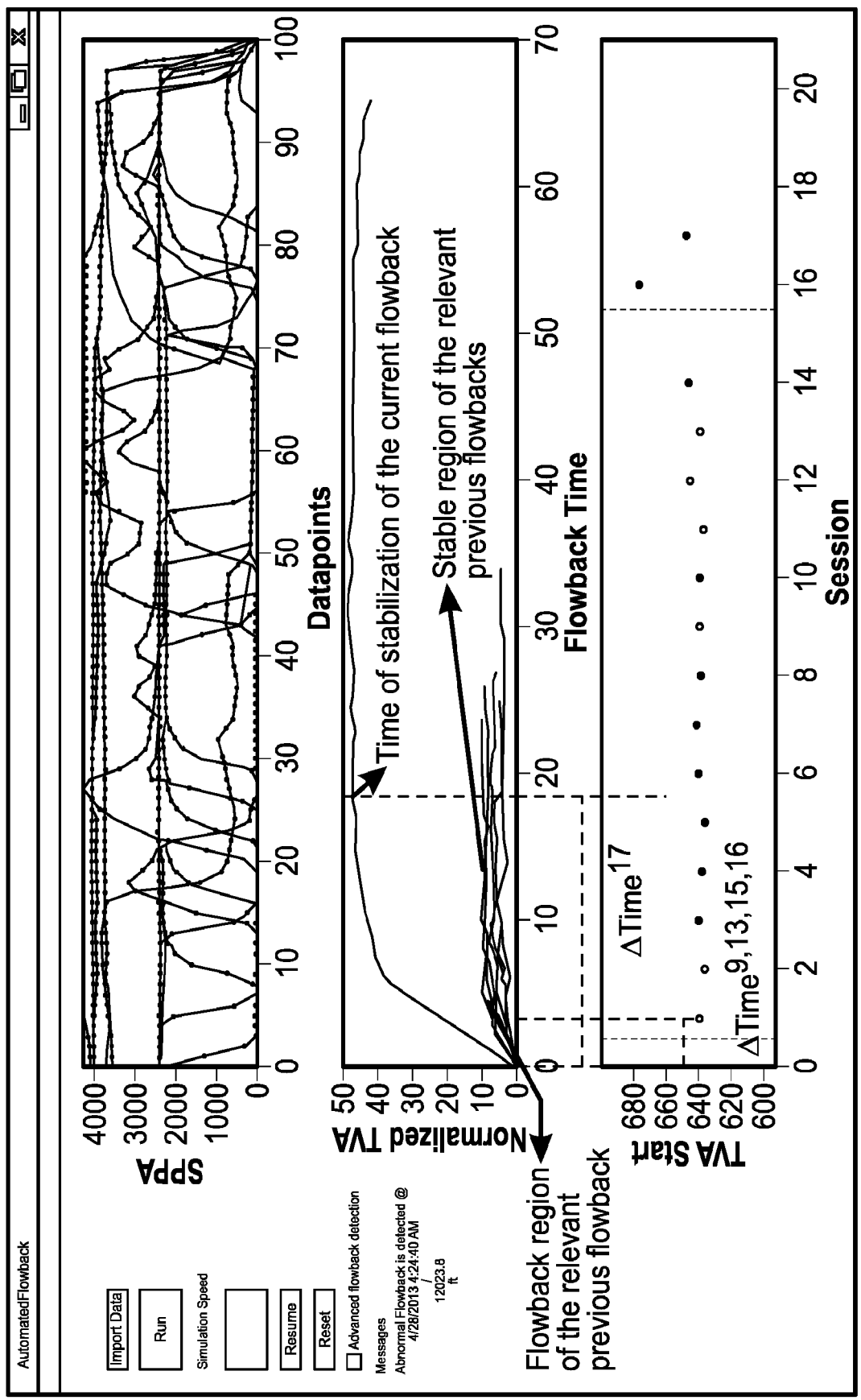
FIG. 10 shows time of stabilization between the abnormal flowback compared to the relevant previous flowbacks.

An example is given in FIG. 10. An influx may be determined by doing such a comparison.

As an alternative, an algorithm that segments the data stream does a regression can be used to break down the flowback data.

By Looking at the Connection Gas Trend

Upon detecting an abnormal flowback, the gas readings at the connections may be compared to automatically look for an increase over the connections upon to the abnormal flowback detected. If there is an increase, the probability of an influx increases over the breathing possibility.

By Looking for Patterns on Pit Volume

Upon detecting an abnormal flowback, the pit volume analysis of connection to connection may be reanalyzed automatically to look for a successive decreasing and increasing pattern over the cycles. If such pattern is detected then the probability of breathing increases.

Such occurrences may be evaluated in a probability matrix to determine the likelihood of breathing over the influx.

Advanced Flowback Detection

In order to do an early kick/loss detection at connections, the precise detection of the true start location/time of the flowback is desirable. A state detection is proposed that finds the location of the true start of the flowback.

There is a delay between the flowback algorithm and pump shut in. Flowback starts as the pressure is relieved from the wellbore. So while the pumps are being shut off, the flowback would already be started. This delay can impair the analysis if not accounted for.

Figure 11:
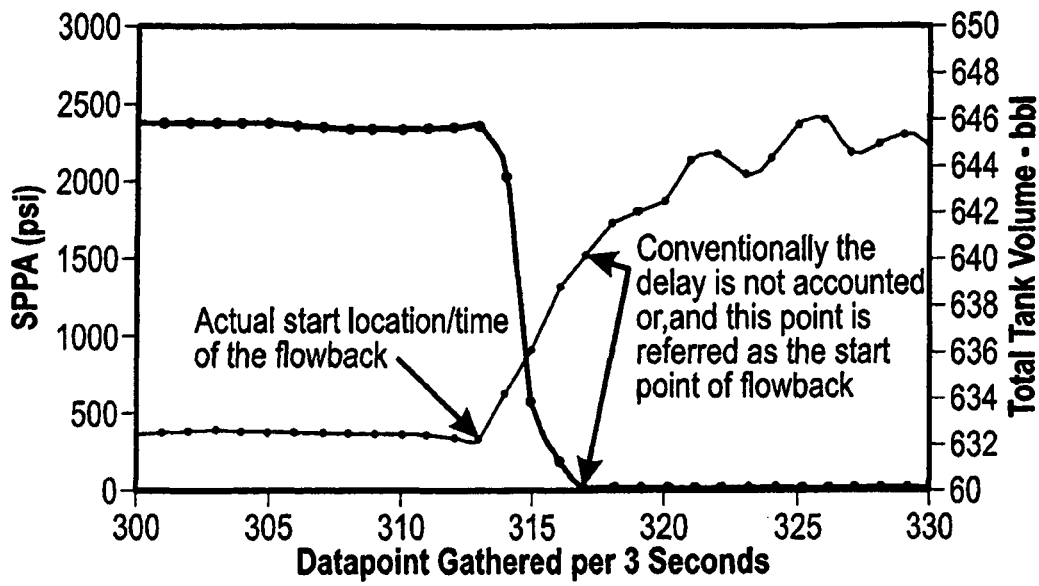
FIG. 11 shows actual start location/time of the flowback vs. the time calculated via basic detection.

In FIG. 11, the actual start location/time of the flowback vs. the time calculated by conventional engines are presented. This conventional calculation is also available in the proposed system and referred as "basic flowback detection".

Figure 12:
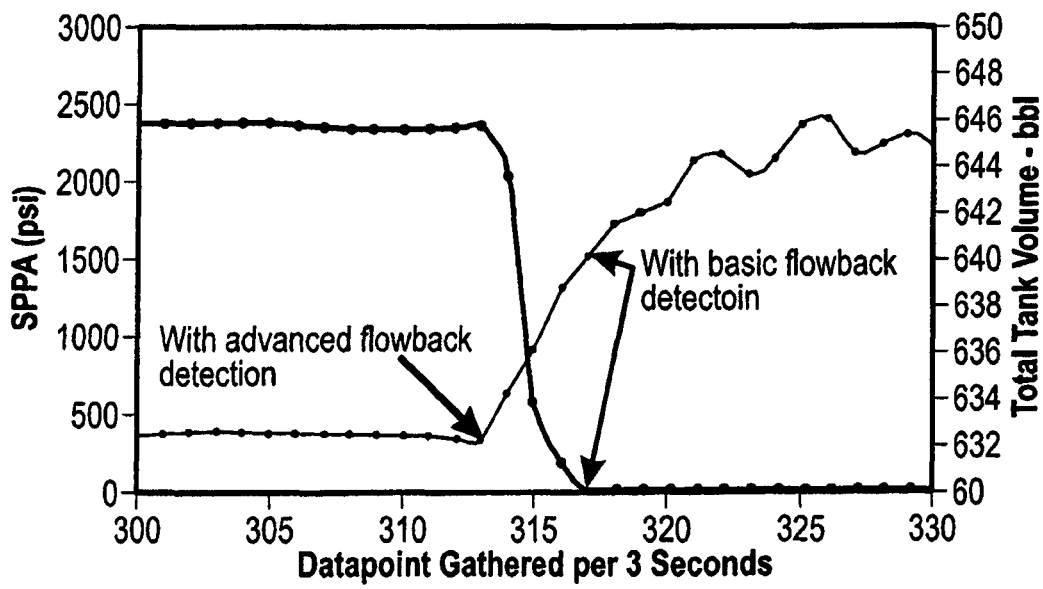
FIG. 12 shows comparison of the basic and advanced methods.

The comparison of the basic and advanced methods is presented in FIG. 12. The basic detection algorithm looks for a time that pump rate goes below a certain threshold, such as 5 gpm. Then records the volume at this time as the start time of the flowback. The advanced method calculates the true location of the start of the flowback.

Figure 13:
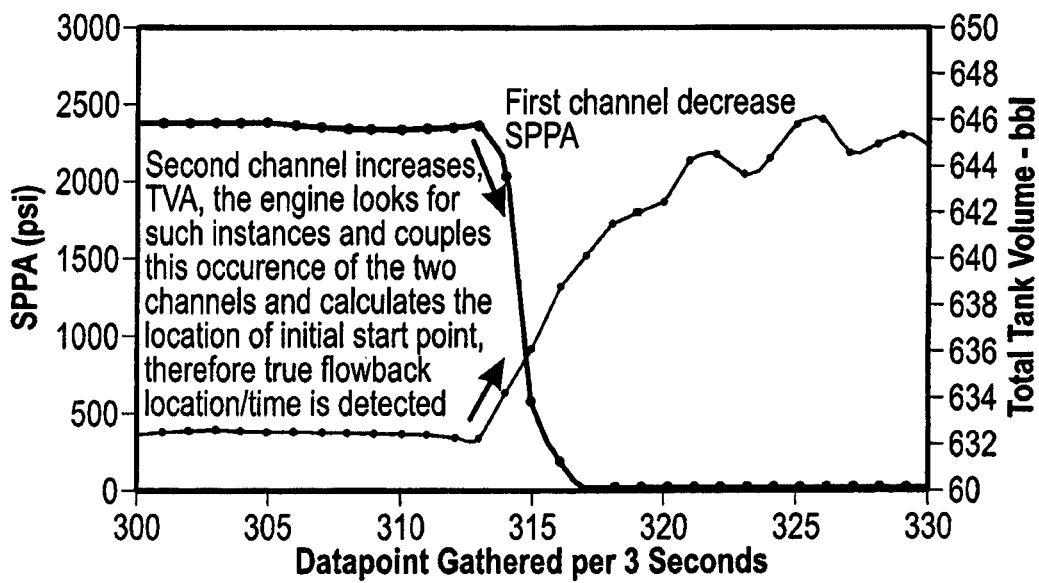
FIG. 13 shows an advanced flowback detection example.

Advanced methods may look for an instance of a decreasing first set of sensor and looks for the start of the point where an increase in the second sensor occurred, such as given in FIG. 13.

As an alternative, an algorithm that segments the data stream can be used to find these occurrences.

Another way to pick up the start of the flow-back region is to monitor the pump stroke rate, or the pump stroke signal itself (normally a once/stroke pulse). (On an automated rig it might be possible to use the instruction to switch the pumps off). With the stroke signal, since it is impossible to tell which pulse is the last one, TAV can be measured immediately after the stroke signal, and then reset when the next one arrives. This will work even on floating rigs with heave.

It is noted that the program can be run at real-time or as simulation for post-mortem analysis. The program can be a web-based application or can be a desktop application and it can be run on windows, linux or ipad, etc.

What is claimed is:

1. A method for detecting an influx and/or loss of circulation in a wellbore, comprising:
    measuring a condition in the wellbore using one or more of a stroke counter, a flow meter, or a pressure transducer prior to a positive displacement pump being shut off;
    determining that the positive displacement pump is shut off;
    predicting pit volume and/or gas concentration at a plurality of time points after the positive displacement pump is shut off using the measured condition prior to the positive displacement pump being shut off, wherein the measured condition prior to the positive displacement pump being shut off correlates with the pit volume and/or gas concentration after the positive displacement pump is shut off;
    measuring pit volume using a fluid level sensor and/or gas concentration using a gas level sensor at the plurality of time points after the positive displacement pump is shut off, the measured pit volume including a total active volume (TAV) and a flowback curve, the flowback curve being a normalized TAV which is reset to zero when the positive displacement pump is shut off;
    comparing the predicted pit volume and/or gas concentration with the measured pit volume and/or gas concentration at the plurality of time points after the positive displacement pump is shut off using a computer; and
    producing a warning signal when the difference between the predicted pit volume and/or gas concentration and the measured pit volume and/or gas concentration is greater than a predetermined value.

2. The method of claim 1, wherein the measured condition comprises one or more of stroke count signal, stroke counter rate, flow rate in, or standpipe pressure.

3. The method of claim 1, wherein the pit volume is total mud volume in the mud pit or total mud volume change in the mud pit.

4. The method of claim 1, wherein a warning signal for an influx is produced when the measured pit volume and/or gas concentration is greater than the predicted pit volume and/or gas concentration and the difference is greater than the predetermined value.

5. The method of claim 1, wherein a warning signal for a loss of circulation is produced when the measured pit volume and/or gas concentration is smaller than the predicted pit volume and/or gas concentration and the difference is greater than the predetermined value.

6. The method of claim 1, wherein a warning signal is produced when the difference between the predicted pit volume and/or gas concentration and the measured pit volume and/or gas concentration at one of the plurality of time points is greater than the predetermined value.

7. The method of claim 1, wherein measuring the pit volume includes identifying a true start of flowback for the flowback curve by identifying a decreasing first measurement of the first condition and a point where pit volume starts to increase.

8. The method of claim 1, further comprising:
    calculating an uncertainty boundary at the plurality of time points based on an average value of the predicted pit volume and/or gas concentration at the plurality of time points;
    comparing the measured pit volume and/or gas concentration at the plurality of time points with the uncertainty boundary at the plurality of time points using a computer; and
    producing a warning signal when the measured pit volume and/or gas concentration is outside the uncertainty boundary at one of the plurality of time points.

9. The method of claim 1, wherein comparing the predicted pit volume and/or gas concentration with the measured pit volume and/or gas concentration is achieved using a segmentation or classification algorithm, or an outlier detection method.

10. The method of claim 1, wherein comparing the predicted pit volume and/or gas concentration with the measured pit volume and/or gas concentration is achieved using a machine learning process.

11. The method of claim 10, wherein the machine learning process is a Gaussian process.

12. A method for detecting an influx and/or loss of circulation in a wellbore comprising:
    measuring a condition in the wellbore using one or more of a stroke counter, a flow meter, or a pressure transducer prior to a positive displacement pump being shut off;
    determining that the positive displacement pump is shut off;

predicting pit volume and/or gas concentration at a plurality of time points after the positive displacement pump is shut off using the measured condition prior to the positive displacement pump being shut off, wherein the measured condition prior to the positive displacement pump being shut off correlates with the pit volume and/or gas concentration after the positive displacement pump is shut off;

measuring pit volume using a fluid level sensor and/or gas concentration using a gas level sensor at the plurality of time points after the positive displacement pump is shut off;

comparing the predicted pit volume and/or gas concentration with the measured pit volume and/or gas concentration at the plurality of time points after the positive displacement pump is shut off using a computer, which includes:
    fitting a first curve over predicted pit volume and/or gas concentration at the plurality of time points;
    calculating a first set of coefficients for the first curve;
    fitting a second curve over measured pit volume and/or gas concentration at the plurality of time points;
    calculating a second set of coefficients for the second curve;
    comparing the first set of coefficients with the second set of coefficients; and producing a warning signal when the difference between the predicted pit volume and/or gas concentration and the measured pit volume and/or gas concentration is greater than a predetermined value as determined by the first set of coefficients and the second set of coefficients being greater than the predetermined value.

13. A method for detecting an influx and/or loss of circulation in a wellbore, comprising:
    measuring a condition in the wellbore using one or more of a stroke counter, a flow meter, or a pressure transducer prior to a positive displacement pump being turned on;
    determining that the positive displacement pump is turned on;
    predicting pit volume and/or gas concentration at a plurality of time points after the positive displacement pump is turned on using the measured condition prior to the positive displacement pump being turned on, wherein the measured condition prior to the positive displacement pump being turned on correlates with the pit volume and/or gas concentration after the positive displacement pump is turned on;
    measuring pit volume using a fluid level sensor and/or gas concentration using a gas level sensor at the plurality of time points after the positive displacement pump is turned on, the measured pit volume including a total active volume (TAV) and a flowback curve, the flowback curve being a normalized TAV which is reset to zero when the positive displacement pump is turned on;
    comparing the predicted pit volume and/or gas concentration with the measured pit volume and/or gas concentration at the plurality of time points after the positive displacement pump is turned on using a computer; and
    producing a warning signal when the difference between the predicted pit volume and/or gas concentration and the measured pit volume and/or gas concentration is greater than a predetermined value.

14. The method of claim 13, wherein the measured condition comprises one or more of stroke count signal, stroke counter rate, flow rate in, or standpipe pressure.

15. The method of claim 13, wherein a warning signal for an influx is produced when the measured pit volume and/or gas concentration is greater than the predicted pit volume and/or gas concentration and the difference is greater than the predetermined value, and/or wherein a warning signal for a loss of circulation is produced when the measured pit volume and/or gas concentration is smaller than the predicted pit volume and/or gas concentration and the difference is greater than the predetermined value.

16. The method of claim 13, wherein a warning signal is produced when the difference between the predicted pit volume and/or gas concentration and the measured pit volume and/or gas concentration at one of the plurality of time points is greater than the predetermined value.

17. The method of claim 13, further comprising:
    fitting a first curve over predicted pit volume and/or gas concentration at the plurality of time points;
    calculating a first set of coefficients for the first curve;
    fitting a second curve over measured pit volume and/or gas concentration at the plurality of time points;
    calculating a second set of coefficients for the second curve;
    comparing the first set of coefficients with the second set of coefficients; and
    producing a warning signal when the difference between the first set of coefficients and the second set of coefficients is greater than the predetermined value.

18. The method of claim 13, further comprising:
    calculating an uncertainty boundary at the plurality of time points based on an average value of the predicted pit volume and/or gas concentration at the plurality of time points;
    comparing the measured pit volume and/or gas concentration at the plurality of time points with the uncertainty boundary at the plurality of time points using a computer; and
    producing a warning signal when the measured pit volume and/or gas concentration is outside the uncertainty boundary at one of the plurality of time points.

19. The method of claim 13, wherein comparing the predicted pit volume and/or gas concentration with the measured pit volume and/or gas concentration is achieved using a segmentation or classification algorithm, or an outlier detection method.

20. The method of claim 13, wherein comparing the predicted pit volume and/or gas concentration with the measured pit volume and/or gas concentration is achieved using a machine learning process.

* * * * *

UNITED STATES PATENT AND TRADEMARK OFFICE
CERTIFICATE OF CORRECTION

| | | |
|---|---|---|
| PATENT NO. | : 10,920,584 B2 | |
| APPLICATION NO. | : 15/765476 | |
| DATED | : February 16, 2021 | |
| INVENTOR(S) | : Oney Erge et al. | |

It is certified that error appears in the above-identified patent and that said Letters Patent is hereby corrected as shown below:

On the Title Page

Item (72) Replace "Ines DE MATA CECILIO" with --Ines DA MATA CECILIO--

Signed and Sealed this
Second Day of May, 2023

Katherine Kelly Vidal
*Director of the United States Patent and Trademark Office*